US007415763B2

(12) United States Patent
Miosga et al.

(10) Patent No.: US 7,415,763 B2
(45) Date of Patent: Aug. 26, 2008

(54) BENDING DEVICE AND METHOD FOR BENDING A PLATE

(75) Inventors: David Miosga, Mülheim an der Ruhr (DE); Peter Schröder, Essen (DE)

(73) Assignee: Siemens Aktiengesellschaft, Munich (DE)

( * ) Notice: Subject to any disclaimer, the term of this patent is extended or adjusted under 35 U.S.C. 154(b) by 348 days.

(21) Appl. No.: 11/385,048

(22) Filed: Mar. 17, 2006

(65) Prior Publication Data

US 2006/0207309 A1 Sep. 21, 2006

(30) Foreign Application Priority Data

Mar. 17, 2005 (EP) .................................. 05005872

(51) Int. Cl.
*F01D 5/32* (2006.01)
*B23P 19/04* (2006.01)

(52) U.S. Cl. .................. 29/889.21; 29/426.1; 29/889.2; 416/220 R

(58) Field of Classification Search ............. 416/220 R, 416/204, 248; 29/426.1, 428, 432, 700, 889, 29/889.1, 889.2, 889.21
See application file for complete search history.

(56) References Cited

U.S. PATENT DOCUMENTS 3,440,706 A 4/1969 Ostergren et al.
3,720,480 A * 3/1973 Plowman et al. ........ 416/220 R
4,455,730 A 6/1984 Guenther
4,915,587 A * 4/1990 Pisz et al. ............... 416/220 R
5,060,375 A 10/1991 Demichel
5,720,596 A * 2/1998 Pepperman ............. 416/220 R
6,398,500 B2 * 6/2002 Pedersen et al. ......... 29/889.21
6,837,686 B2 * 1/2005 Di Paola et al. .......... 416/220 R
6,929,453 B2 * 8/2005 Kite et al. ............... 416/220 R
7,229,252 B2 * 6/2007 Hermiston et al. ...... 416/220 R
7,261,518 B2 * 8/2007 Golinkin et al. ......... 416/220 R
2002/0085917 A1 7/2002 Roberts et al.

FOREIGN PATENT DOCUMENTS

JP 60216003 A 10/1985

* cited by examiner

*Primary Examiner*—David B Jones

(57) ABSTRACT

In order to configure the bending of a plate in an intermediate space between two blade rings, arranged along an axis of a compressor and having blades extending along a radius in a simpler and more effective manner, the novel concept provides a bending device which can be positioned in the intermediate space and has, according to the invention, a fixing element for the bending device, a hydraulic system and a punch which can be actuated by the hydraulic system. Accordingly, a method for bending a plate in the intermediate space provides for a bending device to be positioned in the intermediate space, for the bending device to be fixed in the intermediate space, and for a punch of the bending device to be hydraulically actuated for bending the plate, the punch being moved toward the plate to be bent, and the plate being bent under the effect of the punch.

19 Claims, 2 Drawing Sheets

BENDING DEVICE AND METHOD FOR BENDING A PLATE

CROSS REFERENCE TO RELATED APPLICATIONS

This application claims the benefits of European Patent application No. 05005872.6 filed Mar. 17, 2005, and is incorporated by reference herein in its entirety.

FIELD OF THE INVENTION

The invention relates to a bending device which can be positioned for bending a plate in an intermediate space between two blade rings arranged along an axis of a compressor or a turbine and having blades extending along a radius. The invention also relates to a method for bending a plate in the intermediate space.

BACKGROUND OF THE INVENTION

In a turbine or a compressor, a flow of working medium is admitted to a flow duct formed between a casing and an impeller or rotor. In this case, the flow duct extends along an axis of the compressor or turbine. Blades which are subjected to the flow of the working medium extend along a radius in the flow duct. These blades may be guide blades fastened to the casing or moving blades fastened to the impeller or rotor. The guide blades serve to influence the flow of the working medium. The moving blades are subjected to the flow of the working medium.

In the case of a compressor, the moving blades are set in rotary motion by the impeller and in this way compress the flow of the working medium.

In the case of a turbine, the flowing working medium delivers its kinetic energy to the moving blades, which in this way set the rotor in a rotary motion. The rotary motion of the rotor may be used, for example, for driving a generator and for generating electricity in the process.

A number of blades normally form a blade ring in which the number of blades are placed next to one another in a ring shape along the circumference of the flow duct and are fastened to the casing in the case of guide blades or to the rotor or impeller in the case of moving blades. An expedient number of such blade rings depending on the application are arranged one behind the other in a stepped manner along the axis of a compressor or a turbine. Here, the design and orientation of a blade of a blade ring expediently varies from step to step in accordance with the pressure and temperature ratios of the flow of the working medium along the flow duct. Between a first and a second blade ring arranged along the axis there is an intermediate space in which the medium flows freely.

In the intermediate space, a blade is fastened with its root to the impeller or casing. The fastening can be locked by a plate being bent over in the intermediate space, for example into a gap made at the casing or impeller. This is the case in particular in a compressor. For fitting or removal during production or inspection, such a locking plate has hitherto been bent over manually. To this end, a bending tool in the form of a bar or a suitable lever is positioned at the plate to be bent in an intermediate space between two blade rings arranged along an axis of the compressor and having blades extending along a radius. The plate is then bent over manually by striking the bending tool with a hammer.

This bending operation has to be carried out individually for each locking plate. Of course, on account of the manual activity, defined and reproducible bending-over at a series of plates cannot be ensured. There is also the fact that the manual activity leads to a comparatively long fitting time. The lever forces to be applied are partly so high that, if the lever slips off, there is a comparatively high risk of injury to the fitter and/or a blade of the compressor may be damaged. The impeller or the wheel disk provided for accommodating the blades may also be damaged. In addition, cracks may be initiated in the plate due to undefined, manual bending-over, which cracks may possibly impair the service life and reliable functioning of said plate.

The situation is similar with a bending operation on a plate in an intermediate space in a turbine.

It would be desirable to avoid these disadvantages and improve the bending operation.

SUMMARY OF THE INVENTION

This is where the invention comes in, the object of which is to specify a device and a method for bending a plate in an intermediate space between two blade rings arranged along an axis of a compressor or a turbine and having blades extending along a radius, said device and method at the same time configuring the bending operation more effectively and also more reliably than in the case of a manual bending operation.

With regard to the device, the object is achieved by the bending device mentioned at the beginning, which according to the invention has a fixing element for the bending device, a hydraulic system, and a punch which can be actuated by the hydraulic system.

With regard to the method, the object is achieved by the invention with a method mentioned at the beginning for bending a plate in an intermediate space between two blade rings arranged along an axis of a compressor or a turbine and having blades extending along a radius, wherein a bending device is positioned in the intermediate space. According to the invention, provision is made in this case for the bending device to be fixed in the intermediate space, for a punch of the bending device to be actuated hydraulically for bending the plate, the punch being moved toward the plate to be bent, and the plate being bent under the effect of the punch.

The invention in this case is based on the idea that, in deviation from a manual bending operation, a comparatively automated bending operation can carry out the bending of a plate firstly more effectively and secondly also more reliably. In this case, the invention has recognized that it is possible to specify a bending device which is fixed in an intermediate space and, via a punch which can be actuated hydraulically, can effectively and reliably bend in a defined manner a plate to be bent.

This is because the hydraulic system can be actuated automatically to the greatest possible degree without a fitter having to manually carry out the bending of the plate using an applied lever. On the contrary, it is now the responsibility of the fitter to fix the bending device in the intermediate space and start the hydraulic system.

In this way, defined and reproducible and thus uniform bending-over of a plate, in particular of a locking plate, is achieved. This is because impact forces as in manual bending are avoided. According to the novel concept, therefore, a risk of cracking caused by the impact forces is ruled out.

The method according to the novel concept leads to a saving of time during the bending of a plate, so that it is possible to exchange a blade ring comparatively quickly, in particular in the case of a compressor. In this way, the inspection time and thus the costs required for this are reduced.

Since a fitter no longer has to carry out the bending operation independently using considerable application of force, a risk of injury to the fitter and a risk of damage to a blade are virtually ruled out. On the contrary, a fitter adjusts and fixes the hydraulic bending device and then activates the hydraulic system. The fitter can observe the bending operation and if need be can influence the bending operation by controlling the hydraulic system and the hydraulic force.

Advantageous developments of the invention can be gathered from the subclaims and indicate in detail advantageous ways in which the concept explained above can be realized within the scope of the statement of the object and with regard to further advantages.

The bending device is preferably in the form of a portable bending device which can be used in a mobile manner. In this way, the bending device can be handled in a simple manner and can in each case be properly positioned and fixed, for example, along an axis of a compressor in intermediate spaces following one behind the other.

The fixing element is preferably designed for fixing the bending device in the respective intermediate space along the axis. This has the advantage that the bending device, if the dimensions of the intermediate space vary, for example if the dimensions vary between a first and a second blade ring, can thus be properly fixed even in the event of a variable environment. Suitable for this purpose in an especially advantageous manner is a fixing element in the form of a clamping element which enables the bending device to be clamped in place in the intermediate space along the axis. In particular, the fixing element can be adapted to different intermediate spaces between the blade rings.

The hydraulic system of the bending device preferably has a hydraulic pump, a guide means for hydraulic fluid, for example a feed and discharge, and a cylinder for actuating the punch. The hydraulic pump is expediently interchangeable. To this end, the bending device has in particular a variable connection, via which a pump can be connected. This may be, for example, any desired automatic pump, e.g. a pump often available for an embossing device, or a hand pump which can be manually actuated. This has the advantage that the bending device can be operated with already existing pumps.

The punch of the bending device is preferably interchangeable. This increases the variability of the bending device and makes the bending device adaptable, for example, for a respective plate of a compressor wheel. The bending device can thus be used for a multiplicity of intermediate spaces having variable dimensions. Despite different dimensions of the intermediate spaces along an axis of a compressor or a turbine, one and the same bending device can therefore be used for bending a plate in an intermediate space, namely, inter alia, by the fixing element for clamping the bending device in place being adaptable in a variable manner, and secondly by a punch of the bending device being interchangeable, in particular by virtue of the fact that it can be replaced by a punch of different dimensions.

The punch can preferably be extended in the direction of the radius. In particular in the case of a bending device fixed along the axis of a compressor or a turbine, the punch can thus be extended perpendicularly to the fixing direction of the bending device, namely in the direction of the radius. It has been found that a bending device arranged in this way relative to a turbine or a compressor can be adjusted and fixed in an especially simple and reliable manner and the bending operation can be reliably executed.

To this end, according to a development of the method, the bending device is fixed in the intermediate space along the axis and/or the punch is moved in the direction of the radius toward the plate to be bent. The plate is expediently folded into a groove of an impeller.

BRIEF DESCRIPTION OF THE DRAWINGS

Exemplary embodiments of the invention are described below with reference to the drawing. The drawing is not intended to definitively represent the exemplary embodiments but rather is implemented, where it is useful for explanation, in a schematic and/or slightly distorted form. With regard to additions to the teachings which can be deduced directly from the drawing, reference is made to the relevant prior art. In the drawing, in detail.

DETAILED DESCRIPTION OF THE INVENTION

Figure 1:
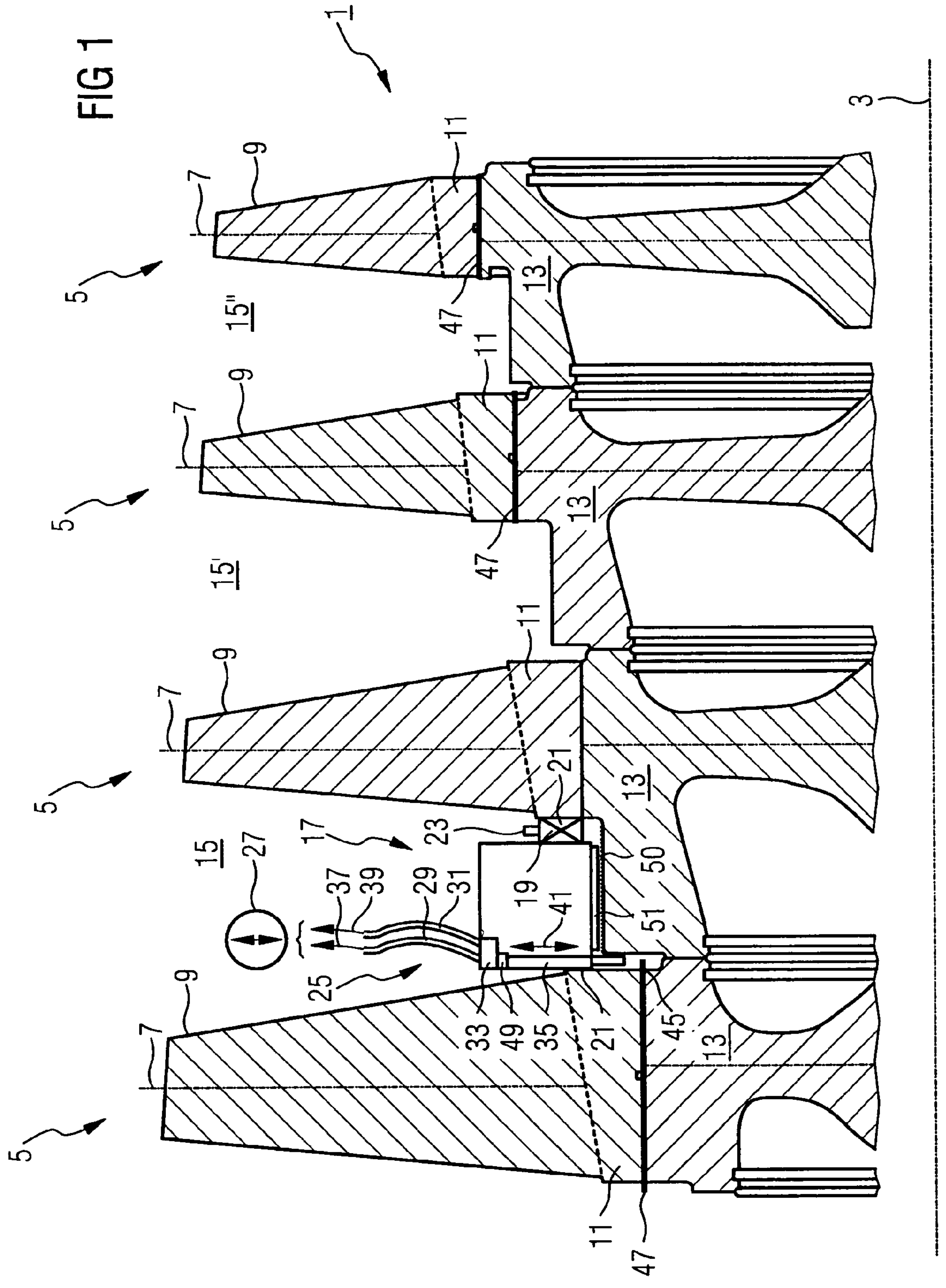
FIG. 1 shows a compressor wheel with fixed bending device according to an especially preferred embodiment.
Figure 2:
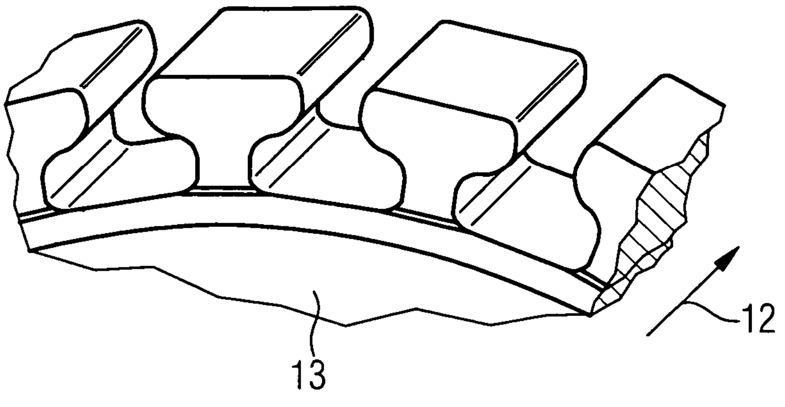
FIG. 2 shows a perspective partial view of a compressor wheel disk with a number of axial retaining grooves for accommodating moving blade roots.

FIG. 1 shows an impeller 1 of a compressor (not shown in any more detail) having a number of blade rings 5 arranged along an axis 3 of the compressor. A blade ring 5 here has a number of blades 9 which extend along a radius 7 and of which in each case one blade 9 is shown in section. A blade 9 of the compressor is in this case held with its root 11, in a similar manner as in a tongue-and-groove joint, on a respective segment 13 of the compressor wheel 1. Here, the groove for locating the root 11 is designed in each case as an axial groove. The orientation and configuration of such locating grooves is shown by way of example in FIG. 2, the arrow 12 indicating the direction of the turbine axis 3. During the fitting of the blade 9 on the impeller 1, the root 11 together with the plate 47 placed underneath is pushed into the groove of the segment 13.

Figure 3A:
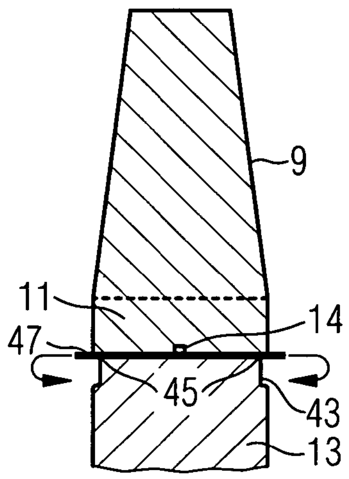
FIG. 3A shows a detail of FIG. 1 with a turbine blade and a locking plate before the bending-over.
Figure 3B:
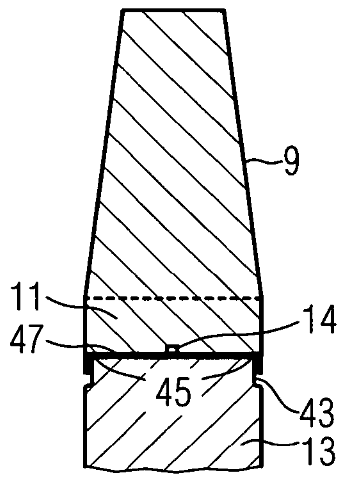
FIG. 3B shows the same detail as in FIG. 3A with a locking plate after the bending-over.

As can be seen in the detailed illustration in FIG. 3A, the plate 47 is provided with a bead 14 in the circumferential direction (i.e. running transversely to the axis 3), and this bead 14 engages in a corresponding recess on the underside of the root 11. The length of the plate 47 is in this case dimensioned in such a way that, immediately after insertion into the groove of the segment 13, it projects on both sides (i.e. in the axial direction) beyond the impeller 1 or the "wheel disk head". This is shown in FIG. 3A. By the projecting lugs being bent over, the plate 47 and also—due to the effect of the bead 14—the blade 9 are fixed with regard to their axial position. The arrangement of the plate 47, acting in this way as a locking plate, after the bending-over (i.e. in the operating state of the compressor) is shown in FIG. 3B. After the bending-over into the groove 43 provided in each case for locating purposes, the lugs of the plate 47 bear flush against the wheel disk head.

Figure 4:
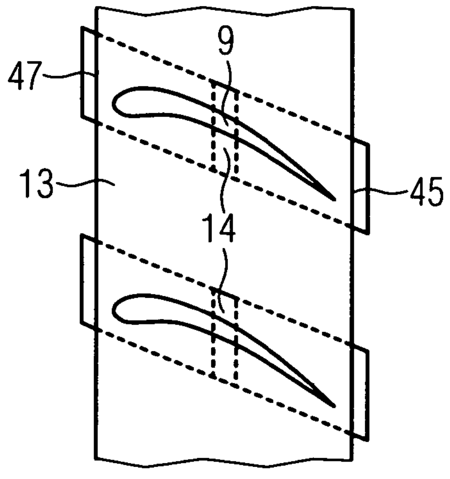
FIG. 4 shows a further partial view of a compressor wheel with turbine plates fastened thereto and locked by locking plates.

The position of the locking plate 47 in relation to the turbine blades 9 and the wheel disk head can also be illustrated with reference to the view reproduced in FIG. 4, in which the direction of view is selected in the radial direction (from the blade tips to the turbine shaft). In the detail shown here, one plate 47 is shown before the bending-over and one plate 47 is shown after the bending-over. In this example, the respective locating groove and thus also the plate 47 are inclined slightly to the direction of the axis 3.

As shown in FIG. 1, a bending device 17 is fixed in an intermediate space 15. To this end, the bending device 17 is positioned in the intermediate space 15 and is clamped in place in the intermediate space 15 between two stops 21 of adjacent segments 13 of the compressor wheel 1 via a fixing element 19 in the form of a clamping element. In this case, the fixing element 19 may be widened via a screw 23 or alternatively via a hydraulic cylinder. The fixing element 23 is either releasably attached next to the bending device in the intermediate space 15 and is widened by actuating the screw 23 or is widened hydraulically. However, the fixing element may also be attached directly to the bending device and already be positioned with the bending device in the intermediate space 15. In this way, the bending device 17 together with the fixing element 19 may have different axial widths, which can also be adapted to an intermediate space 15' or 15", the intermediate spaces 15, 15' and 15" having different dimensions.

In addition, the bending device 17 fixed in this way has a hydraulic system 25. In the embodiment shown in FIG. 1, the hydraulic system comprises a pump 27, a feed 29 and a discharge 31 for a hydraulic fluid, and a hydraulic cylinder 33. The hydraulic cylinder 33 serves to actuate a punch 35. Depending on the inflow 37 or outflow 39 selected, the punch can be extended or retracted in a corresponding movement 41 along a radius 7. To bend a plate 47, the punch 35 of the bending device 17 is actuated hydraulically, the punch 35 being moved along the radius 7 toward the plate 47 to be bent. In this way, the plate 47 to be bent is folded under the effect of the punch 35. In the process, the stop 45 serves as a folding strip for the plate 47 to be bent.

The movement of the punch is effected by a hydraulic piston 49, which extends during feeding 37 of hydraulic fluid from the pump 27. The punch 35 is interchangeable, so that it is adapted to the plate 47 to be fitted in each case, which is designed as a locking plate. A different punch for bending a locking plate can therefore be used in each case in the intermediate space 15' and in the intermediate space 15". As explained, the punch, during extension of the piston 49, travels radially toward the plate 47 to be bent over and folds it over at the stop 45 acting as folding strip.

As an alternative to or in addition to a hand pump, an existing hydraulic pump, for example a hydraulic pump for a mobile embossing device, may also be used. To this end, the bending device 17 may be provided with a variable connection for connecting different pumps 27. The pump 27 provided for the drive of the hydraulic cylinder 33 with the punch 35 can also be used for actuating the fixing element 19, provided the latter is of hydraulic design. Here, the one or the other functional unit can be activated in each case by directional control valves attached in the system of hydraulic lines.

So that the sealing rings 50 or sealing tips which are arranged on the surface of the impeller 1 and which are located opposite the blade tips or the "shroud band" of the guide blades (not shown in any more detail here or removed for maintenance), which reach into the intermediate space 15, 15', 15", are not damaged when fixing the bending device 17 in the intermediate space 15, 15', 15" between two adjacent blade rings 5, the bending device 17 according to the embodiment shown in FIG. 1 is provided with sealing tip protection 51. To this end, the sealing tip protection 51 is designed as a polymer coating, or a coating produced from a soft metal, which is interchangeably fastened to the bending device 17.

In order to configure the bending of a plate 47 in an intermediate space 15, 15', 15" between two blade rings 5, arranged along an axis 3 of a compressor and having blades 9 extending along a radius 7 in a simpler and more effective manner, the novel concept provides a bending device 17 which can be positioned in the intermediate space 15, 15', 15" and has, according to the invention, a fixing element 19 for the bending device 17, a hydraulic system 25 and a punch 35 which can be actuated by the hydraulic system 25. Accordingly, a method for bending a plate 47 in the intermediate space 15, 15', 15" provides for a bending device 17 to be positioned in the intermediate space 15, 15', 15", for the bending device 17 to be fixed in the intermediate space 15, 15', 15", and for a punch 35 of the bending device 17 to be hydraulically actuated for bending the plate 47, the punch 35 being moved toward the plate 47 to be bent, and the plate 47 being bent under the effect of the punch 35.

The invention claimed is:

1. A gas turbine engine locking plate bending system, comprising:

a hydraulic system;

a hydraulic punch arranged along a longitudinal axis of the turbine in an intermediate space between adjacent rotor stages, and actuated by the hydraulic system; and a fixing element arranged between the hydraulic punch and an adjacent down stream rotor stage that secures the hydraulic punch to the rotor in the intermediate space.

2. The bending system as claimed in claim 1, wherein the entire bending device is sized and configured to fit in the intermediate space between adjacent rotor stages.

3. The bending system as claimed in claim 2, wherein the bending device is portable.

4. The bending system as claimed in claim 3, wherein the hydraulic pump is exchangeable.

5. The bending system as claimed in claim 4, wherein the punch is exchangeable.

6. The bending system as claimed in claim 1, wherein the fixing element is a clamping element which enables the hydraulic punch to be clamped in place in the intermediate space.

7. The bending system as claimed in claim 6, wherein the fixing element is adapted to fit into different sized intermediate spaces between rotor stages.

8. The bending system as claimed in claim 1, wherein the punch extends in the radial direction.

9. A method for bending a gas turbine blade locking plate, comprising:

positioning a hydraulically actuated bending device in an intermediate space between two stages of a rotor extending along a radius of the rotor;

fixing the bending device to the rotor in the intermediate space;

hydraulically actuating the bending device to move toward the locking plate; and bending the locking plate due to a force exerted by the bending device on the locking plate.

10. The method as claimed in claim 9, wherein the entire bending device is fixed in the intermediate space along the axis.

11. The method as claimed in claim 9, wherein a punch of the bending device moves in the radial direction toward the locking plate.

12. The method as claimed in claim 9, wherein the locking plate is displaced into a groove of an impeller to lock the blade in place.

13. A portable turbine rotor blade locking plate bending system, comprising:

a portable bending device arranged coaxial with a longitudinal axis of a turbine rotor in an intermediate space between adjacent rotor stages, the bending device containing a punch that moves in the radial direction toward the locking plate;

an actuation device that energizes the punch; and a fixing element arranged between the portable bending device and an adjacent down stream rotor stage that secures the portable bending device to the rotor.

14. The portable bending system as claimed in claim 13, wherein the power actuated punch is hydraulically energized.

15. The portable bending system as claimed in claim 13, wherein the portable bending device is arranged radially outboard of the turbine rotor blade locking plate and the punch acts radially inward to deform the locking plate.

16. The portable bending system as claimed in claim 13, wherein the portable bending device incorporates a sealing tip protector located on a radially inward oriented surface of the bending device.

17. The portable bending system as claimed in claim 16, wherein the tip protection is a polymer or metal coating.

18. The portable bending system as claimed in claim 13, wherein the fixing element is formed in unity with the bending device.

19. The portable bending system as claimed in claim 13, wherein the fixing element is a hydraulic cylinder or a screw clamp.

* * * * *